Figure 1:
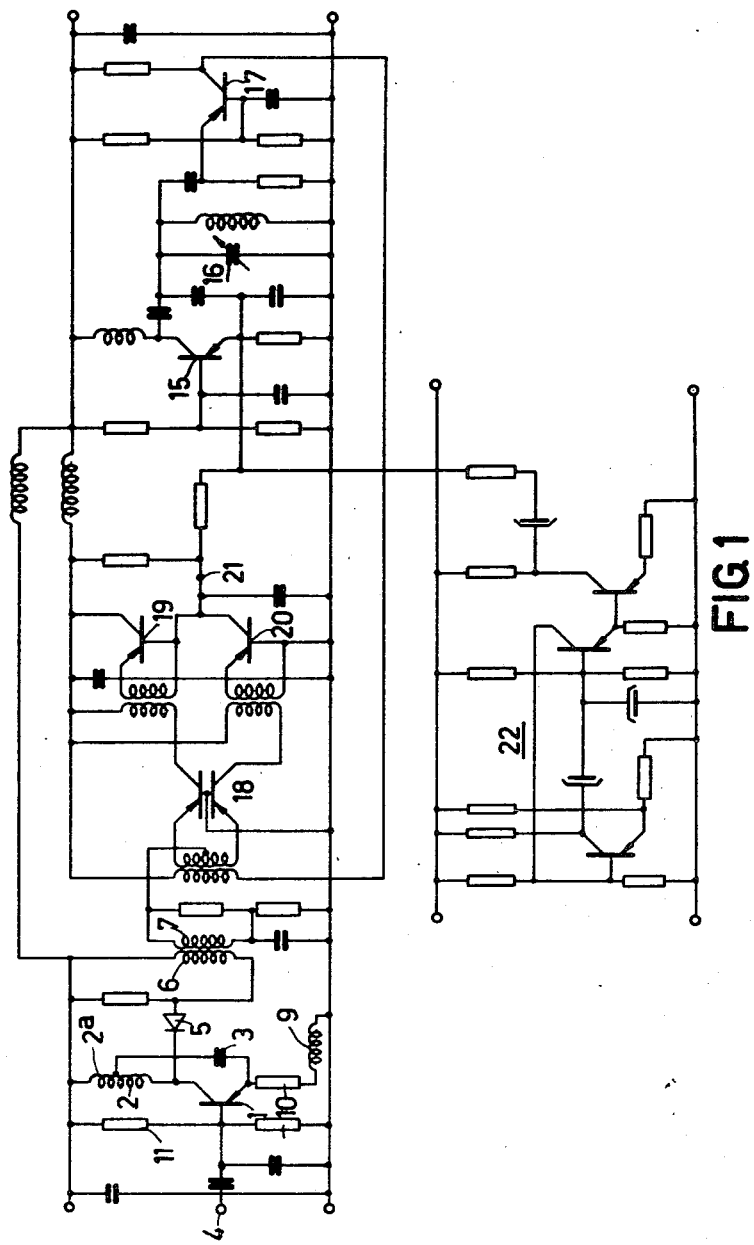

April 28, 1964   M. M. A. A. G. VERSTRAELEN   3,131,310
TRANSISTOR CIRCUIT FOR GENERATING NARROW PULSES
Filed May 16, 1960   2 Sheets-Sheet 1

INVENTOR
MARIE M.A.A. G. VERSTRAELEN
BY
AGENT

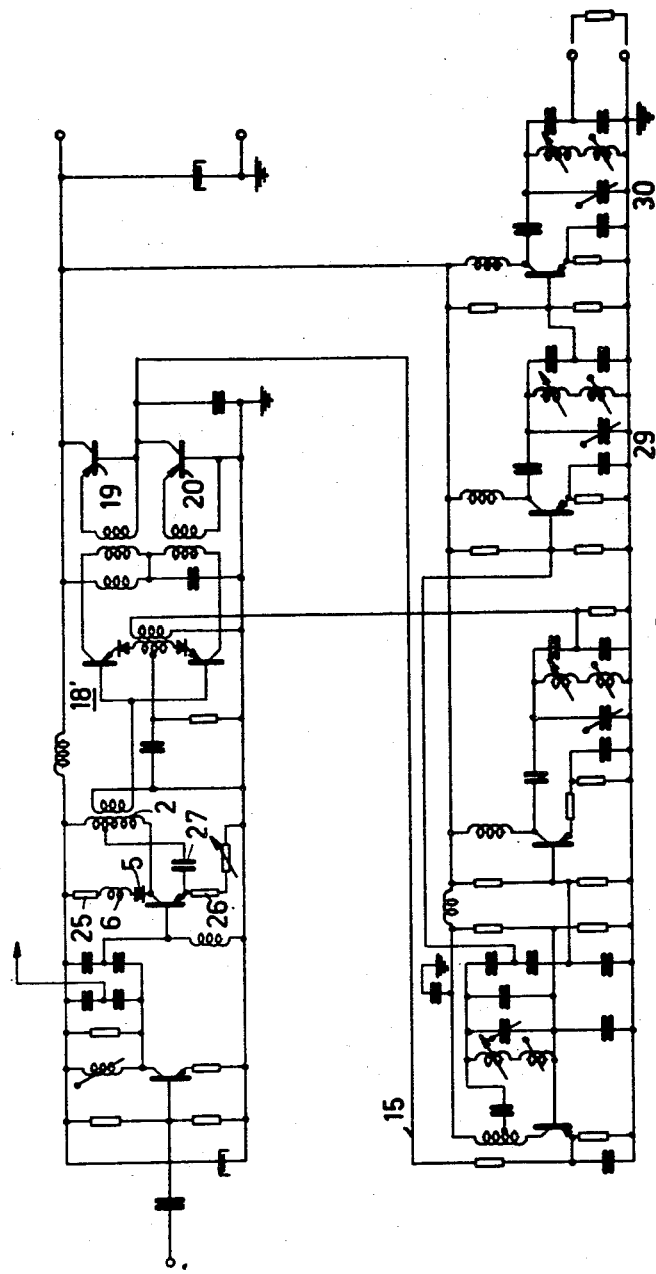

United States Patent Office 3,131,310
Patented Apr. 28, 1964

3,131,310
TRANSISTOR CIRCUIT FOR GENERATING
NARROW PULSES
Marie Marcel Antoine Arnold Ghislain Verstraelen, Hilversum, Netherlands, assignor to North American Philips Company Inc., New York, N.Y., a corporation of Delaware
Filed May 16, 1960, Ser. No. 29,393
Claims priority, application Germany June 4, 1959
3 Claims. (Cl. 307—88.5)

The invention relates to a circuit arrangement for producing electric pulses by means of an inductor to which is supplied, via a preferably transistorized electronic switch, a current which is suddenly interrupted by blocking the switch as a result of which a voltage pulse is produced across the inductor. A particular object of the invention is to produce very short pulses which may be used for example to synchronize a high frequency oscillator at a harmonic of the pulse repetition frequency.

For narrowing electric pulses, it has already been suggested to conduct them through a choke coil driven into saturation. The invention is characterized in that the inductor is connected to a further, preferably smaller, inductance via a rectifier opened by the voltage pulse so that a narrower voltage pulse is formed.

In order that the invention may be readily carried into effect, it will now be described in greater detail, by way of example, with reference to the accompanying drawings.

FIGURE 1 shows a first transistor 1, which by feedback coupling of its collector inductor 2 via a capacitor 3 to its emitter, is connected as pulse oscillator. The pulse repetition frequency may be controlled externally by a synchronizing signal at the input terminal 4, but the circuit arrangement may also be freely oscillating. In the case of a freely oscillating circuit arrangement, the repetition frequency is substantially determined by the value of the feedback part 2a of the inductor 2 and by the value of the resistor 10. The pulse width is determined substantially only by the value of the inductance 2 and its wiring capacitances. With a repetition frequency of for example 100 mc./s., a pulse width of for example 0.2 $\mu$/sec. is found.

According to the invention, the pulse width is narrowed by connecting the inductor 2, via a rectifier 5, to a further inductor 6 which may be formed for example by the primary winding of a transformer 6, 7.

The circuit arrangement operates as follows:

In consequence of the feedback through the capacitor 3 and/or the control voltage at the terminal 4, the transistor 1 operates as an electronic switch. As a result of this an approximately sawtooth current is supplied to the inductor 2. This current produces a voltage drop across the inductor 2 of a polarity such that the rectifier 5 is blocked by it. In this manner a magnetic energy is stored in the inductor 2 equalling $\frac{1}{2}Li^2$, in which L represents the inductance value of the inductor 2 and $i$ the maximum value of the current through this inductance. At the moment the maximum value $i$ of the current is reached, the transistor 1 is blocked, so that the current is suddenly interrupted. As a result of this a considerable voltage pulse is produced across the inductance 2, in consequence of which the rectifier 5 is opened.

Without the use of the rectifier 5, the magnetic energy stored in the inductor 2 would decay in the oscillating circuit formed by this inductor 2 and its wiring capacitance, and this would have a duration determined by the product of this inductance and its wiring capacitance. By opening the rectifier 5, the inductor 2 is connected in parallel to the further inductor 6. As a result of this, however, the width of the pulses produced across the inductors 2 and 6 respectively becomes substantially smaller than before. So, by the measure according to the invention, a very short, high energy and consequently large voltage pulse is produced across the inductors 2 and 6, the inductor 6 preferably being considerably smaller than the inductance 2.

In a practical embodiment for example an inductor 2 of 40 $\mu$h. was used and an inductor 6 of 5 $\mu$h. The capacitor 3 was of 5400 pf., the inductance 9 was of 10 $\mu$h. and the resistor 10 of 2700 ohms. The transistor 1 was a normal pnp-transistor with a base potentiometer consisting of resistors 11 and 12 of 1800 and 470 ohms respectively. In this manner, pulses of an amplitude of 8 volts and a duration of 0.06 $\mu$sec. were obtained across the inductor 6 which was closed by a resistor of 700 ohms.

The pulses produced may be used to synchronize an oscillator oscillating at a harmonic of the pulse repetition frequency. The oscillator comprises the transistor 15 with feedback circuit 16 and separating amplifying stage 17. The voltage pulses produced at the secondary winding 7 of the transformer 6, 7 are compared with respect to the phase with the sinusoidal oscillation produced in the output circuit of the separating stage 17. For this purpose, these two oscillations are supplied to the push pull modulator stage 18 and then detected in push pull by means of the peak current detectors 19 and 20 respectively. The regulating voltage produced at the output terminal 21 controls the frequency of the oscillator 15. To facilitate synchronization, a searching oscillator 22 may be used which, as long as synchronization is not established, causes the frequency of the oscillator 15 to wobble until the regulating voltage required for synchronization is produced.

In the variation as shown in FIGURE 2, the pulses themselves produced across the inductor 2 are used to drive the push pull modulator 18'. The inductor 2 is also shunted by the series connection of the diode 5 and the smaller inductor 6 (for example, 22 $\mu$h.). The additional series resistor 25 was of 47 ohms, the resistor 26 of approximately 1K. ohm. and the capacitor 27 of 5600 pf. The pulses produced had an amplitude of 10 volts and a duration of only 0.03 $\mu$sec. The oscillator 15 and the phase comparison stage 19, 20 are built up in a corresponding manner as shown in FIGURE 1. By additional frequency doubling stages 29—30, an output oscillation is obtained which, by synchronization of the oscillator to be chosen, is adjustable at various upper harmonics of from 24 to 64 mc./s.

What is claimed is:

1. A circuit for producing pulses comprising a transistor having base, emitter and collector electrodes, a source of operating voltage having first and second terminals, a first inductor having a tap, means connecting said first inductor between said collector electrode and first terminal, impedance means connected between said emitter electrode and second terminal, capacitor means connected between said tap and emitter electrode, a series circuit of a rectifier and a second inductor, and means connecting said series circuit in parallel with said first inductor, said rectifier being connected to be non-conductive when collector current flows in said transistor.

2. A circuit for producing pulses comprising a transistor having base, emitter and collector electrodes, a source of operating voltage having first and second terminals, a first inductor, means connecting said first inductor between said first terminal and collector electrode, impedance means connecting said emitter electrode to said second terminal, a tap on said first inductor, capacitor means connecting said tap to said emitter electrode, voltage divider means connected between said first and second terminals providing base bias for said transistor, said circuit comprising a pulse oscillator whereby electric pulses are periodically produced at said collector electrode, and means for shortening the width of said pulses comprising a series circuit of a rectifier and second inductor, means connecting said series circuit in parallel with said first inductor whereby said rectifier is conductive only during the occurrence of said pulses.

3. The circuit of claim 2 wherein the inductance of said second inductor is substantially smaller than the inductance of said first inductor.

References Cited in the file of this patent

UNITED STATES PATENTS

| | | |
|---|---|---|
| 2,896,114 | Maloff | July 21, 1959 |
| 2,995,679 | Skoyles | Aug. 8, 1961 |
| 3,028,508 | Helsdon | Apr. 3, 1962 |
| 3,062,969 | Wilkerson | Nov. 6, 1962 |
| 3,079,511 | Averyt et al. | Feb. 26, 1963 |